United States Patent [19]

Schneider et al.

[11] Patent Number: 4,763,762
[45] Date of Patent: Aug. 16, 1988

[54] PRELOADED BRAKE DISC

[75] Inventors: William C. Schneider; Kornel Nagy, both of Houston; Clarence J. Wesselski, Alvin, all of Tex.

[73] Assignee: The United States of America as represented by the United States National Aeronautics and Space Administration, Washington, D.C.

[21] Appl. No.: 118,992

[22] Filed: Nov. 10, 1987

[51] Int. Cl.[4] .............................................. F16D 65/12
[52] U.S. Cl. ........................... 188/218 XL; 188/251 A
[58] Field of Search ................ 188/73.1, 73.2, 251 A, 188/218 XL, 218 A, 205 A; 192/70.13, 70.14, 107 R

[56] References Cited

U.S. PATENT DOCUMENTS

| | | | |
|---|---|---|---|
| 1,020,737 | 3/1912 | Austin | 192/107 R |
| 3,746,139 | 7/1973 | Bok et al. | 192/107 R |
| 4,613,021 | 9/1986 | Lacombe | 188/218 XL |

FOREIGN PATENT DOCUMENTS

| | | | |
|---|---|---|---|
| 1151830 | 7/1963 | Fed. Rep. of Germany | 188/218 XL |
| 46-26002 | 7/1971 | Japan | 188/73.2 |
| 212220 | 4/1924 | United Kingdom | 192/107 R |

*Primary Examiner*—George E. A. Halvosa
*Attorney, Agent, or Firm*—Russell E. Schlorff; John R. Manning; Edward K. Fein

[57] ABSTRACT

A disc brake system for a shuttle orbiter including an annular disc element (10) having internal radially directed and angularly spaced relief slots (12) and trapezoidial shaped carbon pad members (15) disposed circumferentially around the disc element. T Clips (19, 19') snugly engage the outer ends of the pad members and are attached to rivet heads (34, 35) and (34', 35') and have guide members (51, 51') slidably received in guide grooves (50, 50') in a spring housing (20). Springs (61) provide a force tending to move the T Clips toward the center of the disc where the magnitude of the force can be adjusted by a screw (65).

8 Claims, 2 Drawing Sheets

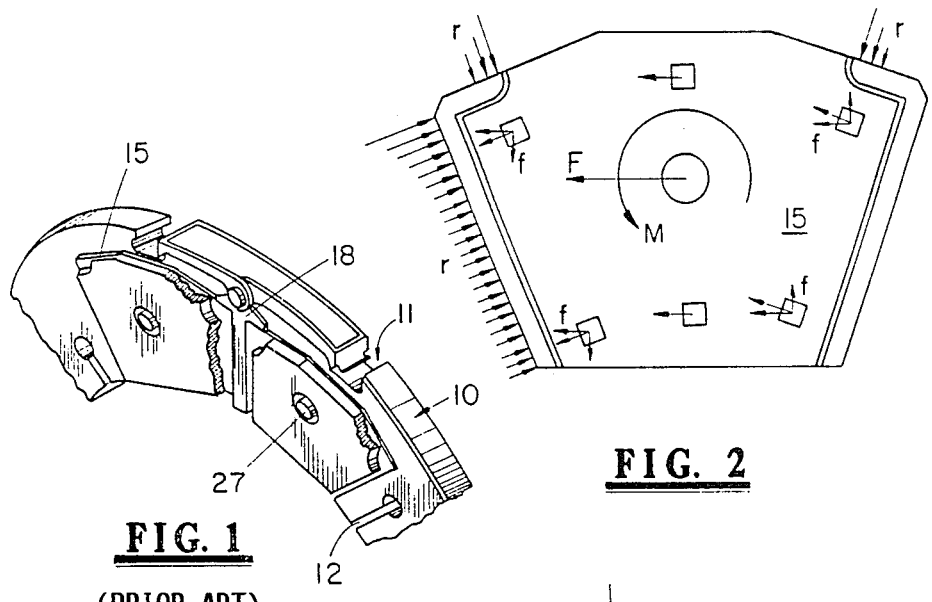
FIG. 1 (PRIOR ART)
FIG. 2
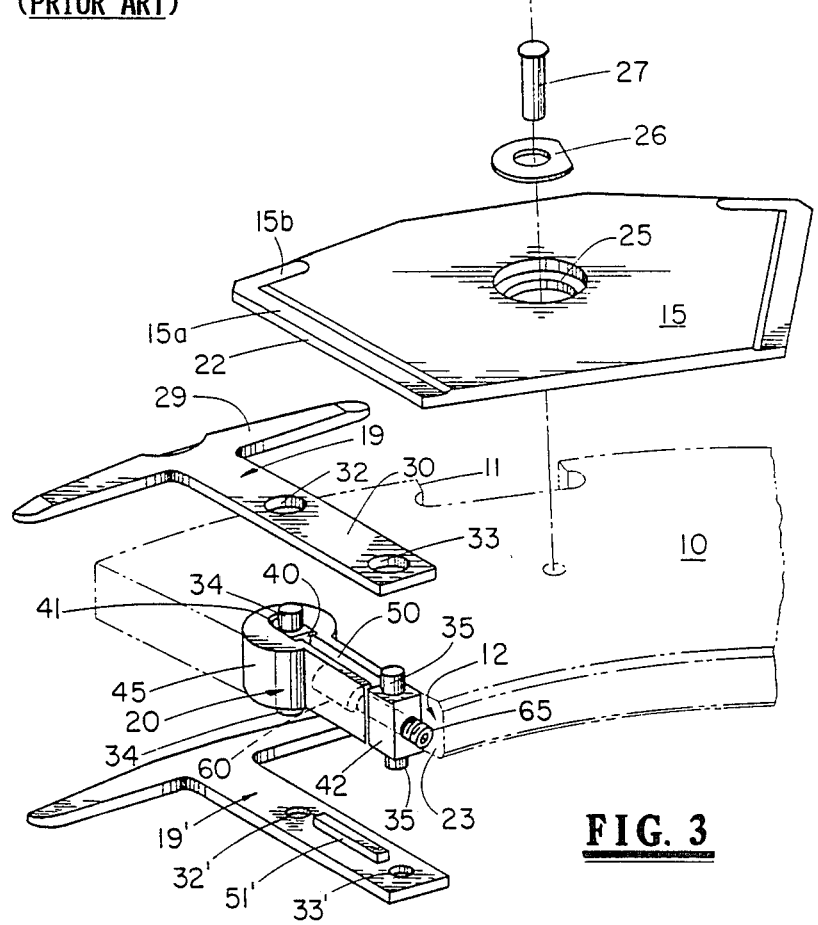
FIG. 3

PRELOADED BRAKE DISC

ORIGIN OF THE INVENTION

The invention described herein was made by employees of the United States Government and may be manufactured and used by or for the Government of the United States of America for governmental purposes without the payment of any royalties thereon or therefor.

FIELD OF THE INVENTION

This invention relates to disc braking system, and more particularly, to a system for mounting carbon friction pads on rotors and stators so as to reduce damage to the carbon pads when subjected to high dynamic braking loads such as encountered in a Space Shuttle Orbiter.

BACKGROUND OF THE INVENTION

Braking systems of a certain type, particularly in aircraft wheels, utilize rotors keyed to a wheel to rotate therewith and stators keyed to a torque tube where relative axial displacement brings the stators and rotors into mutual frictional engagement to apply braking forces. Ordinarily, the braking system is required to convert high energy forces into heat, unfortunately high temperatures are a problem. Another problem is the dynamic shock forces which are also encountered.

The current braking systems for the Space Shuttle Orbiter utilize annularly shaped beryllium rotor and stator annular elements which have flat carbon pads disposed circumferentially on side surfaces about a central axis of the rotor or stator. The carbon pads are trapezoidally shaped with side surfaces of adjacent carbon pads being parallel to one another and are positionally and loosely held on a rotor or stator by a rivet and T clips. The T clips are T shaped members which slidably engage and enclose or hold the side edges of adjacent carbon pads against the rotor/stator with the outstanding arm portions of a T clip limiting radial travel of the carbon pads.

The problem with this type of construction is that the large free play clearance between the carbon pads and the T clips allow high local impact loads and a very nonuniform stress distribution on the edges of the carbon pads. It has been observed that on almost all Orbiter flights the carbon linings were chipped or broken. Carbon, being very brittle, is sensitive to the high local stress caused by the T clip reaction on the pad liners due to braking and brake system dynamics. The damage to the carbon pads causes large bending and torsion stresses in the rotor/stator and can lead to fracture and other damage to the rotor/stator. Therefore, the reliability of the entire Orbiter brake system can be greatly enhanced if the carbon pad damage can be minimized.

PRIOR ART

U.S. Pat. No. 4,149,617 to Dowell et al discloses multi-disc brakes. These brakes contain clips 26, 33 between friction pads 24. These friction pads 24 are of a high energy absorption material resistant to thermal shock, such as carbon composite material. Each arm is divided into two parts 26a and 26b having flat, central longitudinal webbed portions 27a and 27b which are joined together in contiguous relation by rivets 28 and 29. The radially outer end of each arm half 26a and 26b is rebated as at 30a and 30b to pass on opposite sides of a ring 25. Adjacent the rebates 30a and 30b, the outer ends 32 and 33 of the parts 26a and 26b of the arms are formed with projections 37 which are located over chamfered, cut-away corner portions 38 of the friction member paths. This multi-disc brake arrangement is used in braking wheels of aircraft.

U.S. Pat. No. 3,917,043 to Bok discloses a friction disc member for a brake. The friction member 10 has an annular rigid disc member 11 which has sector shaped friction lining segments 16 and 17 mounted on opposite faces 12 and 13. These friction lining segments 16 and 17 may be of a material such as carbon composite material made from pyrrolized graphite cloth. This carbon friction lining material is highly resistant to high temperatures and provides good wear properties. This friction disc member is contemplated for use in the braking system of high performance aircraft. The disc members 11 have a heat sync material having the quality of absorbing large quantities of heat during the braking operations such as beryllium. As seen in FIG. 8, sliding blocks 67 are provided. These blocks may be constructed of heat sync material (i.e. beryllium). In operation, the sliding blocks 67 convey torque forces applied to areas of the friction lining segments 56 and 57 as seen in FIG. 5. Rotation of the segments 56 and 57 is limited by sliding blocks 67 and by rivets 63 engaging in the radially extending edges 58 and 59 of the segments. Also the interfitting ribs 95 engaging the grooves 93 and 49 in the segments will limit rotation. Thus, the connecting block members have one function of transferring the workload from the friction lining segments to the annular sink disc and a second function of providing a heat sink to eliminate any weight and space problems which reduce the effectiveness of the brake arrangement.

U.S. Pat. No. 3,904,000 to Berger discloses a brake disc having a plurality of arcual segments. Brake disc segments 11 are maintained in the form of an annular brake disc by a spring 120 as seen in FIG. 4. The main purpose of this spring 120, however, is for handling so that a complete annular brake disc may be carried and transported instead of various disconnected segments. Also, the spring 120 permits the segments to expand freely into one another and thus virtually all stresses due to expansion are eliminated. Thus, "rattle" between the pads is possible as the segments can readily move with respect to one another as during a hard landing of an aircraft.

U.S. Pat. No. 3,807,534 to Eldred teaches the use of a friction disc adapted for use in an aircraft multiple disc brake arrangement. A carbon or other suitable high thermal capacity heat sinc material in the form of an irregular-shaped segment 34 is slidably trapped in alignment openings 16 and 18. Each segment 34 has a groove or recess therebetween. The radially innermost and outermost sections 52 and 54 of a tongue portion 40 of each segment 34 extends to the peripheral limits of frames 12 and 14. It will be noted that the tongue portion 40, particularly sections 42 thereof, is deeper than the groove or recess 44. A clearance C between the edges of the alignment openings 16 and 18 and the associated adjacent peripheral shoulders of the expanded friction surfaces 36 and 38 of the segment 34 protrudes through openings 16 and 18. This clearance C permits universal sliding movement of the segment 34 in the plane formed between the fixed frames 12 and 14. These frames 12 and 14 are fixed by a generally I-shaped radially extending arm or strut 20 which has a pair of spaced apart rivots 22 and 24. This strut 20 acts as a "T Clip" which permits "rattle" of the brake pads.

U.S. Pat. No. 3,194,347 to Hall illustrates a disc for disc brakes. These brakes have pads 15 of friction material which are retained against radial movement in various ways. In the arrangements shown in FIGS. 1–4, the deep straight-based groove 17 in the radially outermost edge of a path houses a resilient bowed metal clip 18 of which the ends are received in recesses 19 in the ends of a notch. The clip 18 may be secured to the friction pad by retaining screw 21. This arrangement permits easy replacement of worn pads. In FIGS. 5 and 6, a second arrangement is shown wherein strips 23 are used to hold pads 22 against radial movement.

U.S. Pat. No. 4,286,694 to Wiseman, Jr. et al discloses brake disc of carbon material in which the opposed faces of the disc are provided with shallow grooves extending between the inner and outer circumferences to vent steam and other gases generated during braking. As seen in FIG. 5, a sectional view of a wheel 2 and nonrotatable axle 1 with the brake is shown.

U.S. Pat. No. 2,767,817 to Davis discloses a friction disc with removable lining. A frictional lining segment 14 is provided with an outer wall 24 which is curved to correspond to the outer periphery of a plate 12. Pads 28 and 30 are beveled in order to facilitate the mounting of segment 14 on plate 12. A substantially rectangular notch 32 is formed in wall 24 to receive screws 18.

THE PRESENT INVENTION

The present invention involves a liner pad preload device for damage tolerant Space Shuttle Orbiter brake systems. The braking system of the Orbiter comprises individual carbon lining pads attached to beryllium rotors and stators. These pads are held in place by a loose retainer washer and rivet. The pads, during braking, slide into contact with T Clips. The geometry of the pads and the T Clips allow limited "rattle" of the pads which results in an impact to the T Clip. When the carbon pads impact the T Clips or experience large stress gradients, the pads become damaged.

To avoid this damage and possible rotor/stator fracture, the T Clips of the present invention have been designed to allow radial movement of the brake pads and have been designed to provide better support for the brake pads. Also, the T Clip has a raised projection which serves to react to the circumferential loads coming from the brake pads.

The present invention includes a spring housing member containing Belleville springs retained in the housing by a slidable end plug. A force adjustment end member and the opposite end of the housing are connected to the T Clip. By adjusting a screw in the force adjustment member, the springs in the spring housing member may be preloaded. Deflection of the springs causes the T Clips to snugly contact the carbon pads. Any desired load may be applied via the preloading screw.

This modification improves the tolerance of the carbon pads to in-plane dynamics and braking loads. This is accomplished by providing a relatively uniform in-plane compression preload with no free play clearance between the T Clip and the carbon pads. By using Belleville springs, thermal expansion is permitted in the assembly without appreciable preload change. This modification to the shuttle's brake system may be achieved without modification of the existing Beryllium rotors, stators and carbon pads.

BRIEF DESCRIPTION OF THE DRAWINGS

FIG. 1 is a pictoral view of a portion of an annular braking element together with a carbon pad element and a T Clip of the current Shuttle brake;

FIG. 2 is a pictoral view illustrating the frictional forces on the carbon pad in the present brake;

FIG. 3 is an exploded view of a segment of an annular braking element, a carbon pad element, modified T Clips and the preloading device of the present invention.

DESCRIPTION OF THE PRESENT INVENTION

Figure 4:
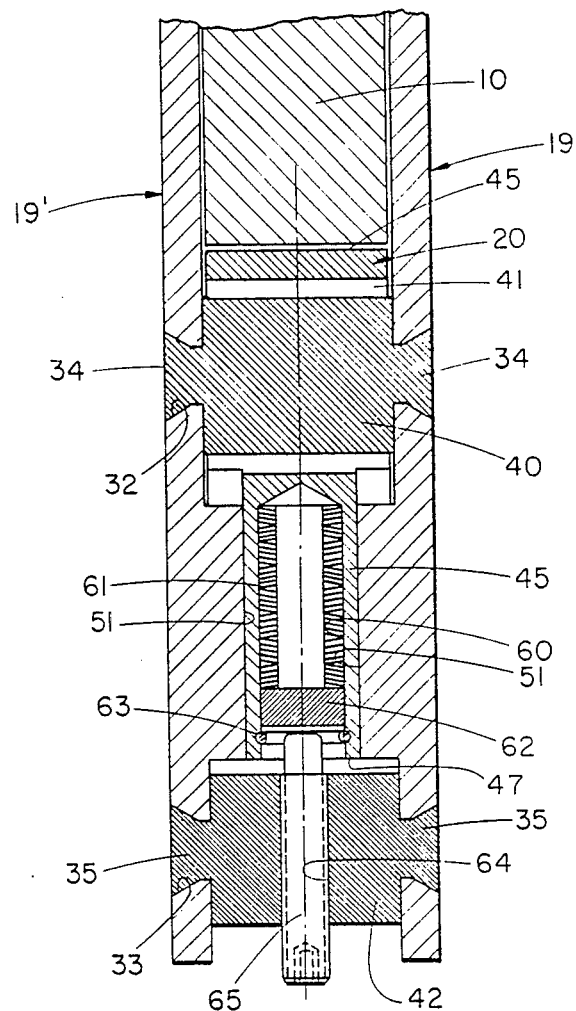
FIG. 4 is a cross-section view of the preloading device and attached T clips.

Referring now to FIG. 1, an annular rotor or stator disc element 10 is illustrated. In the outer circumferential surface of the disc element 10 are conventional latching notches 11 which are located at uniform angular spacing about the axis of the disc element 10. The inner circumferential surface of the disc element 10 has stress relief slots 12 which are shaped similar to a keyhole opening with a radial slot extending to the inner circumferential surface of the annular disc element 10. The slots 12 are equidistantly spaced and are angularly disposed between the latching notches 11.

Carbon pad elements 15 are illustrated in position on the disc element 10. In practice, pad elements will be disposed on both sides of the disc element 10 and uniformly disposed about the central axis. Each pad element 15 is trapezoidally shaped and located so that the side edges of pad elements 15 are parallel to the surfaces defining the radial slots 12. Each carbon pad element 15 is loosely attached to the annular disc element 10 by a rivet 27. A T clip 18 is arranged to overlap a side and upper edge surface of the carbon pad element. The carbon pad element has recesses 15a, 15b along the side and top edge surfaces to accommodate the thickness configuration of the T clip. The structure thus far described is conventional for the Space Shuttle Orbiter.

FIG. 2 illustrates the frictional forces on the carbon pad during the braking process. The integrated frictional forces f over the pad results in a net moment M (tending to rotate the pad) as well as net tangential force F. Carbon, being very brittle is sensitive to high stress gradients such as induced by the T Clips reaction force r on the lining pad edge due to normal friction of braking as well as dynamically induced in-plane impact loads resulting in chipped carbon as seen in pads 15 in FIG. 1.

In the present invention, we utilize existing stress relief slots 12 in a braking system to receive a preloading device 20. In FIG. 3 in an exploded view, the rotor disc element 10 is shown in dashed line with part of a slot 12. The carbon pad element 15 disposed on the upper surface of the disc element 10 has a side edge 22 which is parallel to and displaced to one side of the side surface 23 of the relief slot 12. The carbon pad element 15 has a centrally located recessed opening 25 to receive a washer 26. A rivet 27 is employed in a usual fashion to loosely attach the pad element 15 to the disc element 10.

The carbon pad element 15 has a recessed portion 15a along a radial side edge 22 and a recessed portion 15b along a top surface to snugly receive side and top portions 29, 30 of a modified T Clip 19. The upper and lower modified T Clips 19, 19′ serve to snugly contain the pad elements (the lower pad element is not shown)

relative to the disc element 10 as will be explained subsequently.

The modified T Clips 19 are similar in design to the present T Clips 18 except that the arms are longer providing increased contact area with the carbon pad and providing better support of the brake pad 15.

The T Clips 19, 19' have spaced apart rivet openings 32, 33 and 32', 33' which respectively receive rivet-like heads 34, 35. As shown in FIGS. 3 & 4, the rivet-like heads 34 are attached to a non-circular pin member 40 which has parallel side surfaces for sliding movement in a pin slot 41. The heads 34, 35 are peened during assembly so that the peened heads fill up the countersunk holes 32, 33, 32', 33'. As shown in FIGS. 3 & 4, the heads 35 are integral with a spacer element 42 having parallel side surfaces for sliding movement in the slot 12. The slot 41 for the non-circular pin member 40 is formed in spring housing member 45. The spring housing member 45 has an outer complementarily shaped keyhole configuration to be received in the keyhole shaped slot 12 and is sized to be within the confines of the upper and lower surface planes of the disc member 10.

There is a lengthwise extending plane which is defined by the central axes for the rivet heads 34 and 35 and this plane generally bisects the relief slot 12 and the spring housing member 45 in a longitudinal direction. Between the pin slot 41 in the spring housing member 45 and the terminal end 47 of the housing member 45 are upper and lower lengthwise guide grooves 50, which extend along the lengthwise plane through the rivet heads and which receive elongated guide members 51, 51' on the respective T Clips 19, 19'. The guide members 51, 51' are shorter in length than the guide grooves 50, and provide controlled guidance for radial sliding movement of the T Clips 19, 19' relative to the housing member 45.

The housing member 45 has a blind bore 60 extending inwardly from its terminal end 47. In the blind bore 60 are sets of reversely arranged Belleville spring washers 61. In the open end of the bore 60 is an end plug 62 and retaining snap ring 63. Thus, the end plug 63 retains the washers 61 in the bore 60. The spacer element 42 is provided with a threaded bore 64 and preloading screw 65 in alignment with the end plug 62.

With the foregoing structure, the carbon pad members 15 are attached to a disc member 10 by the rivet assembly. The spring housing member 45, pin member 40 and spacer element 42 are inserted into slot 12. The T Clips 19, 19' are attached by the rivet heads 34, 35 and the T Clips fit into the grooved edges of the carbon pad members. This attaches the pads 15 to the disc element 10. Each preloading screw 65 is operated to force the T Clips 19, 19' toward the center of the disc member 10 until all of the carbon pad members 15 are snugly contained. Then all of the screws 65 are given a specific number of turns in order to deflect the Belleville springs 61 to a specific loading value depending on what the desired load is, which on the Orbiter may be in the neighborhood of 250 pounds. Such preloading will prevent clearance between the T Clips and carbon pads due to dynamic and frictional events during Orbiter landing.

Since the carbon pads 15 are wedge shaped, forcing the T Clips towards the center axis by turning preloading screw 65, the carbon pads 15 are preloaded through the Belleville springs-washers 61 both radially and circumferentially. This provides a relatively uniform in-plane compression preload with no stiffness "dead Band" (free play clearance) between the T Clips and carbon pads. Relative thermal expansion is provided by the low rate Belleville springs. Thereafter, in use when the brakes are subjected to dynamic loading, the containment of the brake pad members by the preloaded T Clips greatly increases the brittle carbon pad's tolerance to the severe dynamic braking environment. The undamaged carbon pads then provide for relatively uniform front to back load/reaction distribution thus reducing possibility of fracture of the beryllium heat sync disc. This then prevents brake lockup.

It will be apparent to those skilled in the art that various changes may be made in the invention without departing from the spirit and scope thereof and therefore the invention is not limited by that which is enclosed in the drawings and specifications, but only as indicated in the appended claims.

What is claimed is:

1. In a disc brake system utilizing annular stator/rotor annular disc elements having loosely attached wedge shaped brittle (carbon based) brake lining pad members, a method for radially and circumferentially preloading lining pad members relative to the supporting annular disc element wherein said disc element has grooves extending radially inward from an inner circumferential surface, said method comprising the steps of:
   connecting a T Clip member to adjacent radially extending edge surfaces of adjacent lining pad members so that the T Clip member engages a substantial portion of the outer top edges of lining pad members, and
   applying a spring force between a T Clip member and a member located within at least one of said grooves to move the T Clip member and lining pad members towards the central axis of the disc member so that such spring force preload works to offset detrimental dynamic forces in a disc brake system.

2. The method as set forth in claim 1 and further including the step of confining the movement of T Clip members to a radial direction upon the occurrence of dynamic forces on the disc member to transmit the friction braking forces from the pads to the disc.

3. A friction disc construction for use under dynamic braking conditions including
   at least one annular disc brake member wherein said brake member has radially extending slots extending outwardly from the inner circumferential surface of the brake member, said slots being angularly disposed about the axis of said brake member,
   wedge shaped brake lining pad members disposed on at least one outer surface of said brake member, said pad members respectively having radial edge surfaces disposed generally parallel to a slot and an outer circumferential surface disposed within the circumference of the outer surface of said brake member,
   means for loosely attaching each lining pad member to the adjacent supporting surface of said brake member,
   T shaped clip means disposed over a radially extending slot and engagable with the outer circumferential surfaces of adjacent brake lining pad members,
   housing means attachable in the radial slot,
   a first slidable element disposed in said housing means arranged for radial slidable movement, second slidable element in the slot and arranged for radial slidable movement, means for attaching said first and second slidable elements to the T Clip means, resilient force means disposed between one of said slidable elements and said housing means for spring loading said T Clip means and liner pad members radially toward the central axis of said disc member.

4. The apparatus as set forth in claim 3 wherein said T Clip means and said housing means have radially extending guide means for controlling the movement of the pad members to a radial direction.

5. The apparatus as set forth in claim 4 wherein said guide means include a radially extending projection member on a T Clip means received in a radially extending groove in the housing means.

6. The apparatus as set forth in claim 3 wherein said radially extending slots have a keyhole shape and said housing means is complimentarily shaped to be received in said keyhole shape, and a guide slot in said housing means for slidably receiving said first slidable element.

7. The apparatus as set forth in claim 6 wherein said second slidable element has a transverse threaded element engagable with said resilient force means.

8. The apparatus as set forth in claim 3 wherein said resilient force means includes reversely stacked sets of Belleville spring members and said second slidable element has means for selectively applying force to said Belleville springs.

* * * * *